United States Patent
Salch et al.

(10) Patent No.: US 9,330,141 B2
(45) Date of Patent: May 3, 2016

(54) FEDERATED QUERY ENGINE FOR FEDERATION OF DATA QUERIES ACROSS STRUCTURE AND UNSTRUCTURED DATA

(71) Applicant: CIRRO, INC., San Juan Capistrano, CA (US)

(72) Inventors: David Herbert Salch, White City, OR (US); Brian Christopher Jew, Laguna Hills, CA (US); Mark Robert Theissen, Orange, CA (US)

(73) Assignee: CIRRO, INC., Aliso Viejo, CA (US)

( * ) Notice: Subject to any disclaimer, the term of this patent is extended or adjusted under 35 U.S.C. 154(b) by 261 days.

(21) Appl. No.: 13/631,707

(22) Filed: Sep. 28, 2012

(65) Prior Publication Data
US 2013/0091122 A1 Apr. 11, 2013

Related U.S. Application Data

(60) Provisional application No. 61/541,036, filed on Sep. 29, 2011, provisional application No. 61/661,737, filed on Jun. 19, 2012.

(51) Int. Cl.
*G06F 7/00* (2006.01)
*G06F 17/30* (2006.01)
*G06F 21/62* (2013.01)

(52) U.S. Cl.
CPC .... *G06F 17/30463* (2013.01); *G06F 17/30474* (2013.01); *G06F 17/30477* (2013.01); *G06F 21/6263* (2013.01)

(58) Field of Classification Search
CPC ................................................ G06F 17/30477
USPC .............................................. 707/718
See application file for complete search history.

(56) References Cited

U.S. PATENT DOCUMENTS

| 2006/0177023 A1 | 8/2006 | Vaghar et al. |
| 2007/0192296 A1 | 8/2007 | Burger et al. |
| 2008/0022370 A1 | 1/2008 | Beedubail et al. |
| 2008/0120273 A1* | 5/2008 | Ramesh et al. ................... 707/2 |
| 2010/0145929 A1 | 6/2010 | Burger et al. |

OTHER PUBLICATIONS

"Data Federation: The Key to Harnessing Big Data", A Cirro White Paper, Cirro, 2012, pp. 1-11.
"A New Era for Data Access and Exploration for Total Data," A Cirro White Paper, Cirro 2012, pp. 1-10.
Garcia-Molina, et al., Chapter 16—The Query Compiler, *Database systems: the complete book*, Jan. 2002, Pearson Education, pp. 787-874.
Kabra, et al., "efficient mid-query re-optimization of sub-optimal query execution plans," Sigmod Record, Jun. 1998, vol. 27, No. 2, pp. 106-117.

* cited by examiner

*Primary Examiner* — Ajith Jacob
(74) *Attorney, Agent, or Firm* — McDermott Will & Emery LLP

(57) ABSTRACT

The subject technology provides querying structured and unstructured data across disparate incompatible systems with a single language and connection point. Cost based optimizations are provided for executing the query. In some configurations, logical plans for executing a query are generated. For each of the logical plans, the subject technology generates a set of physical plans for executing the query on data systems, determines an execution cost for each physical plan from the physical plans, and selects a respective physical plan with a lowest determined execution cost among the determined execution cost for each physical plan. A physical plan is then selected for execution with a lowest execution cost among the selected respective physical plans of each of the logical plans. Data from an operation from the query may then be persisted and then used for generating a new set of logical and physical plans for executing a remaining set of operations from the query.

25 Claims, 10 Drawing Sheets

405

Select A.id, B.name, C.state from A join B on A.id=B.id
join C on B.id=C.id

410

420

FEDERATED QUERY ENGINE FOR FEDERATION OF DATA QUERIES ACROSS STRUCTURE AND UNSTRUCTURED DATA

CROSS-REFERENCE TO RELATED APPLICATIONS

The present application claims the benefit of priority under 35 U.S.C. §119 from U.S. Provisional Patent Application Ser. No. 61/541,036 entitled "FEDERATED QUERY ENGINE FOR FEDERATION OF DATA QUERIES ACROSS STRUCTURE AND UNSTRUCTURED DATA," filed on Sep. 29, 2011, and U.S. Provisional Patent Application Ser. No. 61/661,737 entitled, "FEDERATED QUERY ENGINE FOR FEDERATION OF DATA QUERIES ACROSS STRUCTURED AND UNSTRUCTURED DATA," filed on Jun. 19, 2012, the disclosures of which are hereby incorporated by reference in its entirety for all purposes.

BACKGROUND

Data systems contain a variety of data query and storage engines from a variety of manufacturers. Each engine has certain advantages and disadvantages for its use, as well as different versions of data access languages such as SQL (Structured Query Language). All these differences present a complex problem for users who want to extract value from the data regardless of where the elements of data may exist. For instance, those users make multiple connections, use multiple tools, and possess a variety of skills to enable access to data as a whole.

SUMMARY

The subject technology provides for receiving a query for data stored across a plurality of data systems. The subject technology provides for generating a plurality of logical plans for executing the query. The subject technology generates a plurality of logical plans for executing a query. For each of the plurality of logical plans, the subject technology generates a first set of physical plans for executing the query on the plurality of data systems based on the respective logical plan, determines an execution cost for each physical plan from the first set of physical plans, and selects the physical plan with a lowest determined execution cost from the first set of physical plans. A physical plan is then selected with a lowest execution cost among the selected respective physical plans of each of the logical plans. A first operation from the query is then executed according to the selected physical plan among the selected respective physical plans of each of the logical plans. The subject technology updates the query based on results from the executed first operation from the query, generates a second plurality of logical plans for executing a new query for a remaining set of operations from the query based on the results and respective physical plans for each of the second plurality of logical plans, and selects a physical plan with a lowest execution cost among the respective physical plans for each of the second plurality of logical plans. A second operation is then executed from the new query according to the selected physical plan. The new query is then updated based on results from the executed second operation from the new query. For a second new query based on a remaining set of operations from the new query, the subject technology repeats steps for generating logical plans, selecting a physical plan, executing an operation among the second remaining set of operations, and updating the second new query until the second new query is complete.

The subject technology further includes a system. The system includes memory, one or more processors, one or more modules stored in memory and configured for execution by the one or more processors. The system includes a protocol module configured to receive a query. The system includes a parser module configured to receive the query from the protocol module, validate a syntax of the received query, convert the query into a query tree if the syntax is validated, and identify each data element referenced in the query tree. Additionally, the system includes a binder module configured to configured to add metadata for each data element referenced by the query tree. The system also includes an optimizer module configured to determine one or more physical execution plans based on the query tree, estimate a cost for each of the physical execution plans based on the metadata for each data element referenced by the query tree, and select a respective physical execution plan with an overall lowest estimated cost. Further, the system includes an execution engine module configured to execute an operation from the query based on the selected respective physical execution plan, and persist data resulting from the executed operation from the query.

Additionally, the subject technology provides for receiving a query for data stored across a plurality of data systems, generating a plurality of logical plans for executing the query and a respective plurality of physical plans for executing each of the plurality of logical plans, and determining an execution cost for each of the physical plans. An operation from the physical plan having the lowest execution cost is then executed, and the query is updated based on results from the executed operation. Further, the subject technology repeats the generating, determining, executing, and updated steps until the query is complete.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several configurations of the subject technology are set forth in the following figures.

FIGS. 4B-1 and 4B-2 conceptually illustrate an example set of alternative physical plans for a first query tree.

FIGS. 4C-1 and 4C-2 conceptually illustrate an example set of alternative physical plans for a second query tree.

DETAILED DESCRIPTION

Figure 1:
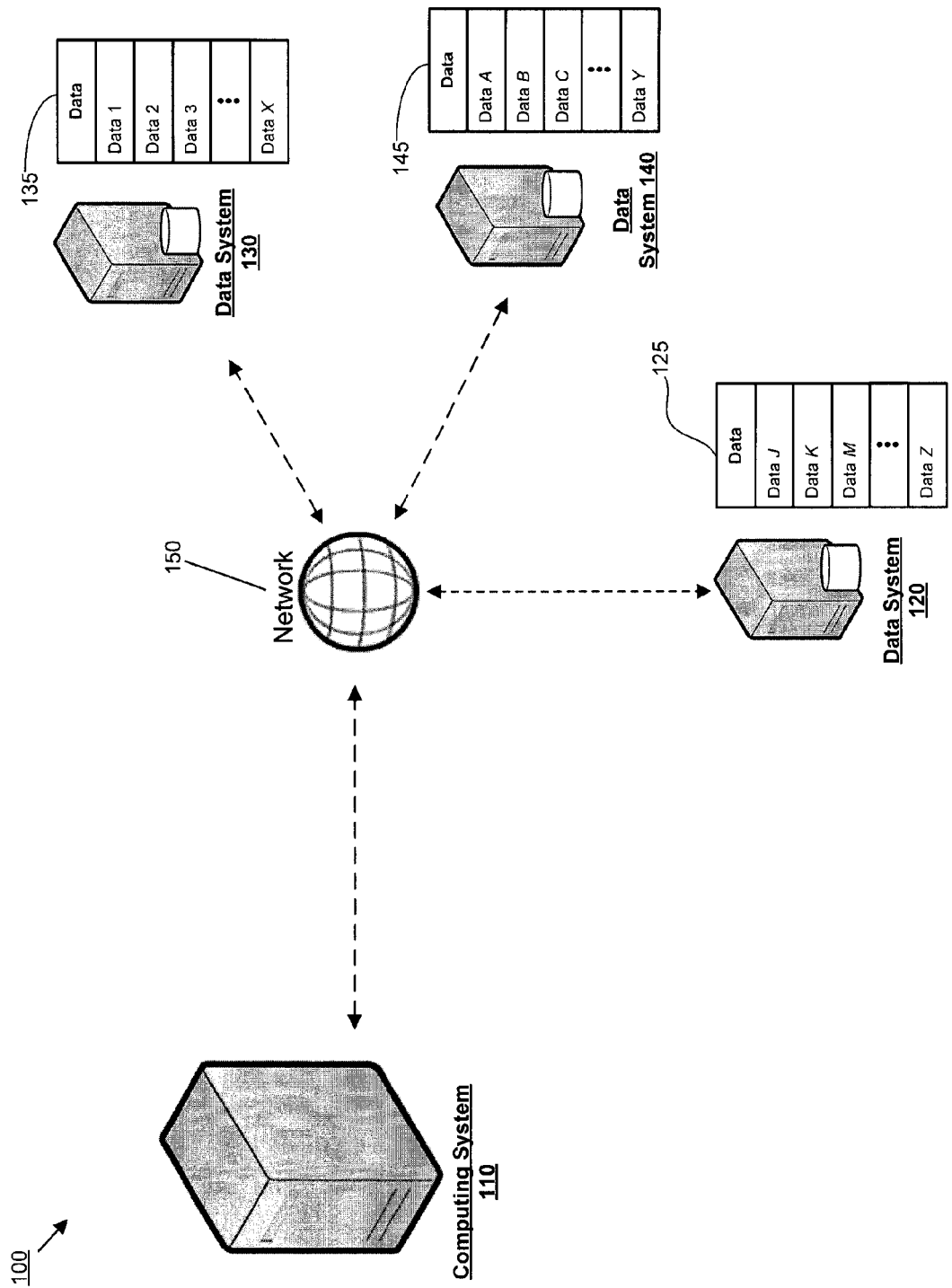
FIG. 1 illustrates an example computing environment for federation of data queries across one or more computing systems according to some configurations of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Some approaches to handle a heterogeneous computing environment for accessing data across disparate systems may resolve only a part of the problem of accessing these types of widely spread and different data stores. Performance, ease of use, manageability, interoperability, cost of ownership, and other concerns should be addressed to resolve this complicated problem in an effective manner.

Adding to all of this difficulty is the emergence and acceptance of new unstructured data stores such as HADOOP, a software framework that supports data-intensive distributed applications, which operate totally differently from structured data stores. Allowing federation over these engines in addition to structured stores is a much more complex problem requiring a new approach to federation. Although the emergence of these unstructured data stores increases the need for federation to allow melding of data from both structured and unstructured stores, it increases complexity of doing so dramatically.

A related significant hindrance to using unstructured data such as HADOOP provides within map-reduce is the need to do programming for specific functionality. This increases the skill level required dramatically and prevents common business users from extracting value from unstructured data. The melding of data from structured and unstructured stores is also difficult and complex, requiring yet another skill set. All of these requirements hinder the adoption of the use of unstructured data significantly and greatly complicate the combined use of data as a whole.

In some configurations, the subject technology advantageously fills the aforementioned deficiencies by providing a system including a federated query engine that advantageously allows for automatic querying of both structured and unstructured data alike from multiple data engines and stores without prior configuration and with optimal performance. In this manner, the herein described federated query engine provides access to any and all data stores with a single language and access point.

One objective of the subject technology is to abstract the physical storage of the data from the logical use of that data. This objective can be accomplished in one or more of the following ways: providing a single connection point to query data in multiple engines using a single tool and single language; invisibly managing the movement of data between the engines that partake in the query execution; providing access to unstructured data in the same syntactical manner as structured data; and providing the ability to process data within a structured or an unstructured engine in equivalent functionality.

Another objective of the subject technology is to provide fast performance without the user needing to understand the details of cost for each operation on various systems. This objective may be accomplished by costing both structured and unstructured data operations across multiple data engines in a normalized fashion, taking into account data movement costs, then providing periodic re-optimization to ensure that the best plan is chosen as information becomes more precise.

Another objective of the subject technology is to produce metadata and cost metrics for completed operations from queries that can be used subsequently to produce performance predictions and improve on cost analysis in future executions. This allows the herein described system to improve in predictive accuracy through time. Yet another objective of the subject technology is to provide a solution for data access among various data stores and engines and types that does not suffer from many of the problems or deficiencies associated with other solutions.

FIG. 1 illustrates an example computing environment 100 for federation of data queries across one or more computing systems. More specifically, the computing environment 100 includes a computing system 110 and data systems 120, 130 and 140.

In some configurations, the computing system 110 includes a federated query engine for executing a data query or queries across multiple data systems for accessing different types of data stored in a database or similar storage scheme on a respective data system. In this manner, the federated query engine may coordinate execution of a query across the multiple data systems. The federated query engine is described in further detail below.

As illustrated in FIG. 1, the data systems 120, 130 and 140 are multiple autonomous data systems that respectively store data 125, data 135 and data 145. Moreover, the data systems 120, 130 and 140 (including data stored therein) may aggregately form a federated data system that manages/provides federated data across the multiple data systems. Some examples of data stored by a respective data system may include, but are not limited to, data stored according to a relational database management system, data from an online social networking service, data stored across a distributed system (e.g., NoSQL, HADOOP), metadata, etc. Other types of data may be provided in a respective data system and still be within the scope of the subject technology.

As illustrated in the example of FIG. 1, the computing system 110 and the data systems 120, 130 and 140 are interconnected via a network 150. In one example, the computing system 110 utilizes an appropriate data connection(s) (e.g., Java Database Connectivity, Open Database Connectivity, etc.) for communicating with each of the data systems. Over one or more data connections, the computing system 110 can transmit and receive data via the network 150 to and from the data systems 120, 130 and 140. The network 150 can include, but is not limited to, a local network, remote network, or an interconnected network of networks (e.g., Internet). Similarly, the data systems 120, 130 and 140 may be configured to communicate over the network 150 with the computing system 110 by using any sort of network/communications/data protocol.

Although the example shown in FIG. 1 includes a single computing system 110, the computing system 110 can include a respective cluster of servers/computers that perform a same set of functions provided by the computing system 110 in a distributed and/or load balanced manner. A cluster can be understood as a group of servers/computers that are linked together to seamlessly perform the same set of functions, which can provide performance, reliability and availability advantages over a single server/computer architecture. Additionally, other data systems may be included in the example computing environment and still be within the scope of the subject technology.

Figure 2:
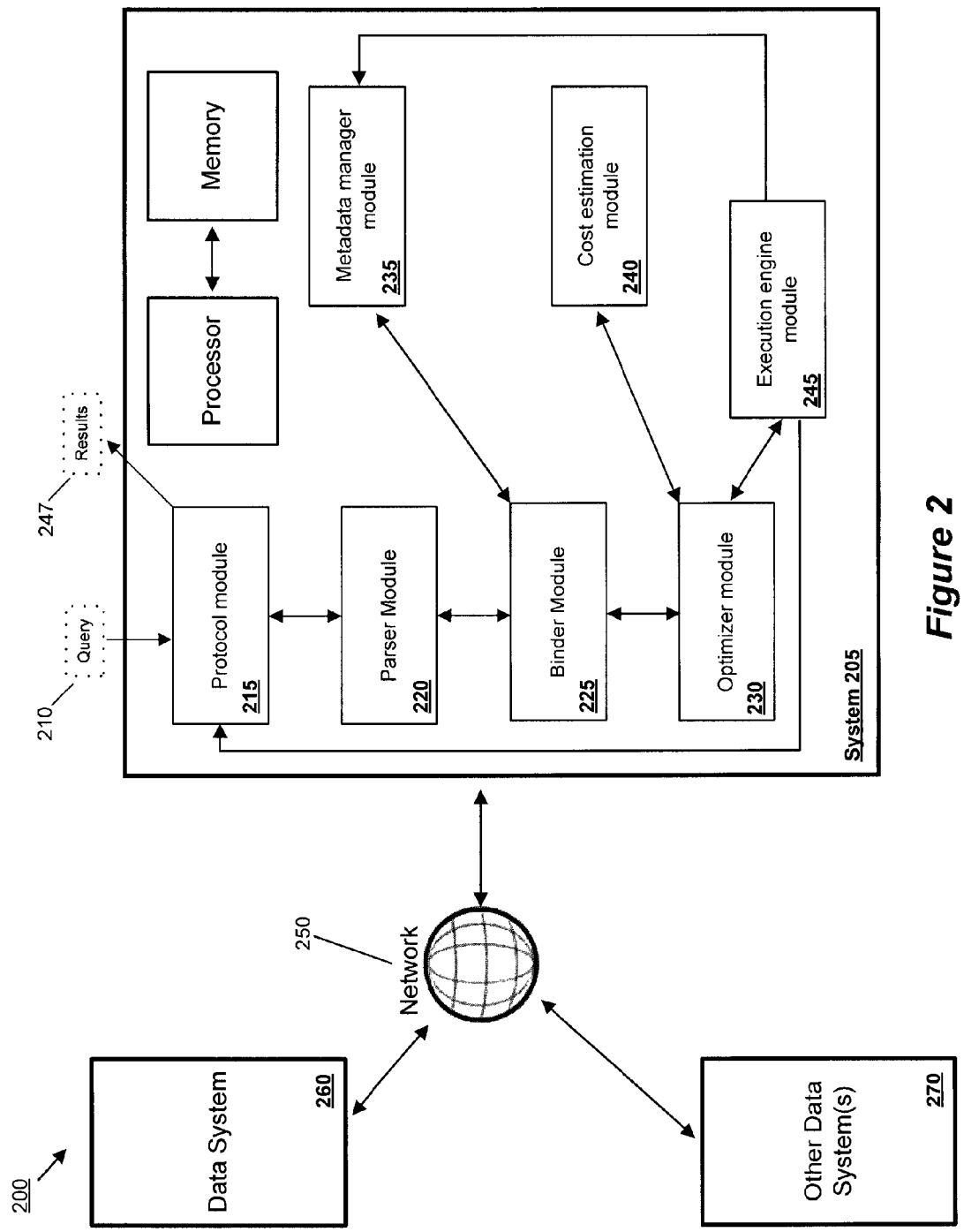
FIG. 2 conceptually illustrates a high level architectural layout of a system that implements a federated query engine according to some configurations of the subject technology FIG. 3 conceptually illustrates an example process for executing several operations of a query according to a cost determination of a set of execution plans for the query.

FIG. 2 conceptually illustrates a high level architectural layout 200 of a system 205 that implements a federated query engine according to some configurations of the subject technology. The federated query engine can be implemented for execution on one or more computing devices/systems. In particular, FIG. 2 shows a system 205 for implementing the federated query engine described in the computing system 110 in FIG. 1 and the processes in FIGS. 3 and 5. The following description of FIG. 2 may describe different operations in a linear fashion for the sake of not obscuring the discussion. However, it should be appreciated that any of the operations described in FIG. 2 may be executed in a parallel manner and still be within the scope of the subject technology.

The system 205 includes memory, one or more processors, and one or more modules stored in memory and configured for execution by the one or more processors. As shown in FIG. 2, the system 205 includes several modules for providing different functionality. According to one aspect of the subject technology, a federated query engine is provided that includes the following components: a protocol module 215, a parser module 220, a binder module 225, an optimizer module 230, a metadata manager module 235, a cost estimation module 240 and an execution engine module 245.

The protocol module 215 is configured to manage end user connections by utilizing standardized database connectivity technologies such as JAVA Database Connectivity (JDBC) or Open Database Connectivity (ODBC), etc. In this manner, the protocol module 215 is configured to allow for a variety of connection types to be utilized. After a connection is established, one or more queries received from a corresponding end user are transmitted to the parser module 220 for validation. For instance, an end user connects to the federated query engine through an industry standard protocol such as but not limited to ODBC or JDBC. The end user then submits a query 210 using a common language such as SQL. The protocol module 215 extracts the text of the query 210 into a standard internal format (e.g., a format that the federated query engine may process) irrespective of the protocol used to connect to the federated query engine. The protocol module 215 then transfers the query 210 to the parser module 220 for processing.

The parser module 220 is configured to validate that a syntax of the language used within the received query is without syntactical error according to a set of predetermined syntactical rules. After the syntax of the query 210 is validated, the query 210 is converted into a query tree which is then transmitted to the binder module 225. By way of example, the parser module 220 receives the query 210 from the protocol module 215 and parses out the words or tokens. The parser module 220 is configured to check the syntax of the query 210 for correctness based on the parsed words or tokens. If the syntax of the query 210 is correct, the parser module 220 converts the query 210 into a query tree. Examples of a query tree are described in more detail with respect to FIG. 4A below. The parser module 220 is configured to then identify each data element referenced in the query tree. An example of a data element may be a table stored on a particular data system or similar source of data. The parser module 220 then transmits the query tree to the binder module 225.

The binder module 225 receives the query tree from the parser module 220. The binder module 225 is configured to access the metadata manager module 235 to lookup each data element referenced by the query tree to add associated metadata. For instance, the binder module 225 contacts the metadata manager module 235 for each data element referenced in the query to bind associated metadata to each data element. After all associated metadata is bound to corresponding data elements referenced within the query tree, the binder module 225 transmits the query tree to the optimizer module 230.

The metadata manager module 235 is configured to bind to the data element any known metadata about that element. Such metadata may include a number of rows, row size, and/or data types. The metadata manager module 235 is configured to contact an appropriate persistent data store for that such metadata. In one example, the persistent data store is identified by the naming convention of the data element, which contains an identifiable reference to the data element location. For instance, the metadata manager module 235 contacts an appropriate metadata store for the data element being processed. The metadata manager module 235 is configured to utilize any required communication mechanisms for the various metadata stores. In this manner, any metadata synchronization issues between the federated query engine and the data stored on the metadata stores are minimized.

In one example, the metadata stores respectively correspond to a data system registered with the federated query engine. In particular, a metadata store may store metadata for unstructured data elements when the system 205 does not carry enough metadata. In one example, the metadata for unstructured data elements is stored within a relational database that allows the metadata to be controlled/modified by the system 205. In instances in which other entities are able to modify the metadata in a given metadata store, the metadata manager module 235 is configured to perform a "lookup" of the metadata in that metadata store. Thus, the metadata manager module 235 does not necessarily store any persistent metadata, and instead performs lookups as required (e.g., when other entities may modify the metadata and the system 205 does not control the metadata). Any matching metadata for a given data element from the query tree is then returned to the binder module 225 for that data element.

After the metadata manager module 235 returns metadata to the binder module 225, the binder module 225 determines an output data size of a bottommost node in the query tree and then the above nodes are able to calculate an estimate of an output data size for each of the above nodes. This is done because a shape of a query plan may change as a logical exploration continues up through the query tree. The binder module 225 is configured to then transmit the query tree augmented with metadata and the data size estimates to the optimizer module 230 for processing.

The optimizer module 230 is configured to initially process a logical representation of the query tree, and then determine any alternative physical plans. Examples of these operations are described in further detail in FIGS. 3 and 5. For instance, the optimizer module 230 makes the best choice on how to execute the query given multiple possibilities based on the logical and physical plans. In one example, the optimizer module 230 is configured to determine an estimated cost to each possible execution plan for each required operation or group of operations and then select the best overall execution plan based on the estimated cost. As described in further detail below, the estimated cost may be based on a historical record of completed queries, business rules, actual dynamic runtime loading metrics and/or other data or metrics.

Costs may be initially seeded with initial predetermined values (e.g., based on one or more operations for small, medium, or large systems) for each data system, and each subsequently executed operation may be statistically incorporated into the initial predetermined values as part of the historical record for determining an estimated cost. In one example, the estimated cost in the historical record is allowed to gradually drift based on a weighted average between a current value for a recently executed query and an existing value (e.g., based on the initial predetermined cost). The aforementioned estimated cost may be derived through utilizing the cost estimation module 240. As an additional alternative implementation, the cost estimation module 240 processes each operation or groups of operations, and queries each functionally capable data engine provided by a corresponding data system to determine an estimated cost in some configurations. The estimated cost may be based on latency for the data system, cost per row, cost per operation in the query, etc. Actual dynamic runtime loading metrics may also be utilized to determine the estimated cost. With respect to business rules, the cost estimation module 240 may remove some options according to one or more business rules that specify time of day constraints, security concerns, etc. Additionally, the cost estimation module 240 is configured to normalize the costs across multiple data systems to present a normalized cost value to the optimizer module 230. The optimizer module 230 is configured to then select the overall best execution plan based on the corresponding estimated cost (now normalized). The selected execution plan for the query is then transmitted to the execution engine module 245 for execution.

The execution engine module 245 receives the selected execution plan for execution of the query (as represented in the query tree) and begins to perform the necessary execution by generating proper syntax for the corresponding data system and requesting the engine to execute an operation or set of operations from the query. In one example, to execute the plan, the execution engine module 245 uses appropriate drivers or connection methods to connect to each data system and transfers the proper syntax across the proper protocols. The execution engine module 245 also executes any required data movement operations to move data from one data system to another through appropriate protocols and commands.

Once that operation or set of operations is complete, the execution engine module 245 may persist any data resulting from the operation(s) and then retrieve further metadata about the operation and results. The execution engine module 245 then sends any updated metadata information back to the optimizer module 230 and requests a re-optimization given the results of the operation(s). The re-optimization may result in a changed plan of execution for the remainder of the operations from the execution plan that have not yet executed. The execution engine module 245 then receives a plan with the lowest cost from the optimizer module 230 and performs another operation from the query. These aforementioned steps of re-optimization may be repeatedly performed for each of the remaining operations in the query. However, in some instances, re-optimization is not performed.

Once the query is entirely executed, the execution engine module 245 is configured to then transmit results 247 of the query back to the protocol module 215 for transmitting to the end user. When the entire execution plan has been executed, the results 247 from the execution engine module 245 are transmitted to the protocol module 215. The protocol module 215 is configured to format the results 247 and submit the results 247 to the end user using the appropriate protocols.

Additionally, in some configurations, the metadata manager module 235 is contacted by the execution engine module 245 to record new values for actual execution time, sizes, etc., into the metadata about a given data system. In this manner, the system 205 builds a historical record per operation executed to refine the data over time and allow for more accurate estimations in the future. These data values can be specific to include things such as the size of data processed, loading on the system at the time, individual step operation executed, type of data, etc.

Figure 3:
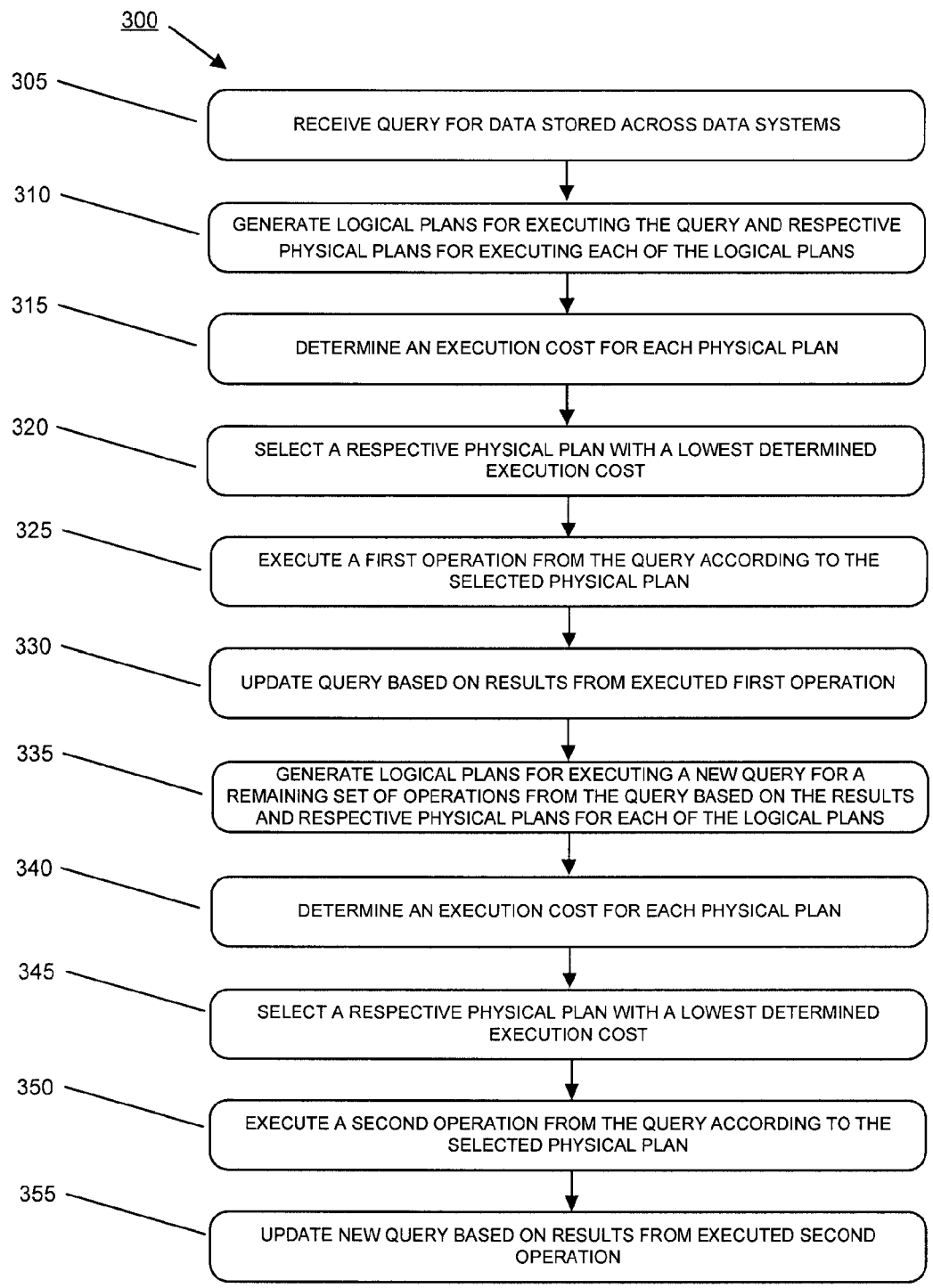

FIG. 3 conceptually illustrates an example process 300 for executing several operations of a query according to a cost determination of a set of execution plans for the query. The process 300 can be performed by one or more computing devices or systems in some configurations. More specifically, the process 300 describes steps that are performed by the aforementioned federated query engine for executing a query in one example. Although the example process 300 illustrated in FIG. 3 shows a linear execution of operations, it should be appreciated that any of the operations in FIG. 3 may be executed in a parallel manner and still be within the scope of the subject technology.

The process 300 begins at 305 by receiving a query for data stored across a multiple data systems. The data stored across the multiple data systems may include federated data in some implementations.

At 310, the process 300 generates logical plans for executing the query and respective physical plans for executing each of the logical plans. In some configurations, each logical plan includes a sequence of one or more operations for executing the query. In one example, each logical plan comprises a query tree including one or more nodes, each node representing a respective operation in the sequence of one or more operations for executing the query. Each node of the query tree either has an expected data size or is capable of calculating the data size through recursive algorithms. Thus, rather than include an estimated output data size for all of the nodes in the query tree, it is more beneficial to recursively calculate a size estimate at any stage for any of the above nodes in the query tree. Further, as mentioned above, the process 300 at 305 generates respective physical plans for executing the query on the data systems for each of the logical plans. Each physical plan represents a set of operations that describe corresponding physical steps for executing the operations. For instance, a respective physical plan may describe permutations for physically moving data from one data system to another data system for performing one or more operations from the query. Moreover, some configurations provide that an available data system, which does not initially include any of the required data from the query, may be included in a respective physical plan. Thus, a respective physical plan need not be limited to the actual data systems which initially include the required data from the query, and any available data system may be included for a given physical plan for performing an operation(s) from the query.

The process 300 at 315 then determines an execution cost for each physical plan from the respective physical plans. In some configurations, the process 300 looks at costs associated with latency, cost per row, movement costs, and/or cost per operation in order to determine the execution cost for each physical plan. In one example, the costs may be determined when applied to the aforementioned size estimates and/or based on additional metadata associated with a given data system. For instance, the metadata may be based on a historical record of costs for performing respective operations of previously executed operations, which in turn may be normalized across different data systems. Initially, each data system may be seeded with initial predetermined costs (e.g., based on one or more operations for small, medium, or large systems), and each subsequently executed operation may be statistically incorporated into the initial predetermined costs as part of the historical record for determining an estimated cost. In one example, the estimated cost in the historical record is allowed to gradually drift based on a weighted average between a current value for a recently executed query and an existing value (e.g., based on the initial predetermined cost). In this regard, the historical record of costs may be weighted more heavily toward older historical data than for newer data.

The process 300 at 320 then selects a respective physical plan with a lowest determined execution cost among the determined execution cost for each physical plan from the respective physical plans. In this manner, the process 300 may utilize the respective physical plan that is predicted to provide optimal performance based on execution costs.

The process 300 continues to 325 to execute the first operation from the query tree according to the selected physical plan. The first operation may correspond with a bottom node from the query tree.

At 330, the process 300 updates the query based on results from the executed first operation. In some configurations, as part of updating the query, the process 300 may persist data resulting from the executed first operation from the query. Alternatively, the process 300 may not persist data but may continue to execute more operations from the query before deciding to persist the data. By way of example, the process 300 may determine to persist data when no dependencies exist after a particular operation. Further, the process 300 may determine to persist data based on the data systems involved and the type of data movement that is to be performed. For example, in a case where data can be streamed between locations, such as between different data systems, persisting the data may not be needed in this case. In other cases, the data must be prepared for movement between locations and the data is persisted. In some configurations, movement of data between heterogeneous data systems will require some data to be persisted. The persisted data may be stored in a temporary table on a given data system for subsequent access in some configurations.

The process 300 at 335 1) generates logical plans for executing a new query for a remaining set of operations from the query, and 2) generates respective physical plans for each of the logical plans for executing the new query. In some configurations, generating the respective physical plans may be based on persisted data and/or newly available meta-data. In this regard, corresponding size estimates in a respective physical plan may be replaced with the results of the first operation (or from the results stored in the persisted data) in order to generate the respective physical plans. At 340, the process 300 determines an execution cost for each of the respective physical plans. Next, the process 300 at 345 selects a physical plan with a lowest execution cost among the respective physical plans.

The process 300 at 350 executes a second operation from the query according to the selected physical plan. Alternatively, the process 300 in some instances continues to execute one or more operations until reaching a point for performing a re-optimization of logical and physical plans based on the results of the executed operations. At 355, the process 300 updates the new query based on results of the executed second operation (or executed operations). The process 300 then ends. In this manner, the process 300 may execute the plan with the lowest execution cost after completing each operation in the query as the plans are re-optimized to account for the results of a previous operation, which may result in a more accurate estimation of costs for the plans.

Although executing a first and second operation are described in the example of FIG. 3, it should be understood that the process 300 repeats the above described steps for re-optimizing the physical plans for the remaining operations until each operation from the query is executed. The process 300 may then provide the results of the query for output after the query is completely executed. The process 300 then ends.

Figure 4A:
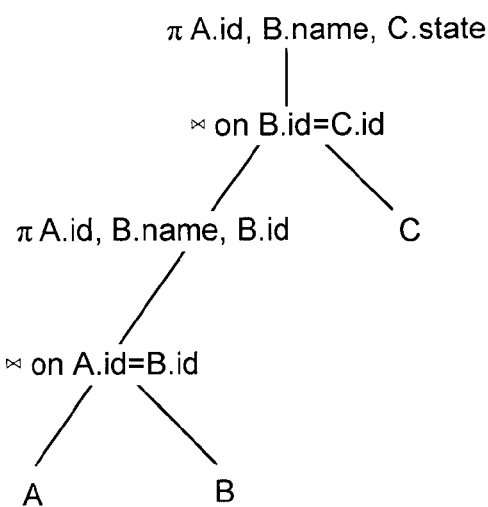
FIG. 4A conceptually illustrates example query trees for a query according to some configurations of the subject technology.
Figure 4A:
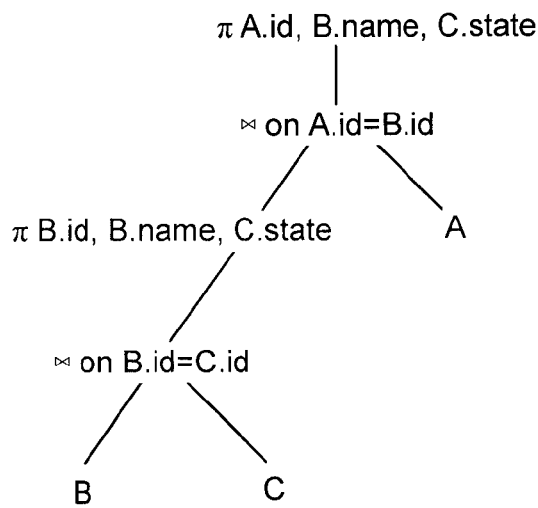

FIG. 4A conceptually illustrates example query trees for a query 405 according to some configurations of the subject technology. As illustrated, FIG. 4A includes query trees 410 and 420 which represent possible logical plans for executing the query 405 (illustrated as "Select A.id, B.name, C.state from A join B on A.id=B.id join C on B.id=C.id"). In the example shown in FIG. 4A, the query 405 includes operations on tables A, B, and C, and tables A, B and C are respectively stored on three different data systems 1, 2 and 3. Query trees 410 and 420 may provided by the federated query engine when generating logical plans for a given query. Query trees 410 and 420 include multiple nodes that each represent a respective operation or set of operations from the query 405. Although two query trees are shown in the example of FIG. 4A for the sake of simplicity, it should be appreciated that more query trees for other logical plans for the query 405 may be provided and still be within the scope of the subject technology.

For each of the query trees 410 and 420 corresponding to respective logical plans for the query 405, the federated query engine may provide a set of physical plan alternatives for executing the query 405. As mentioned above, the query 405 includes operations on tables A, B, and C, and tables A, B and C are respectively stored on three different data systems 1, 2 and 3. A set of physical plan alternatives for the query trees 410 and 420 are respectively illustrated in FIGS. 4B-1, 4B-2, 4C-1 and 4C-2 described below.

Figures 1, 4B:
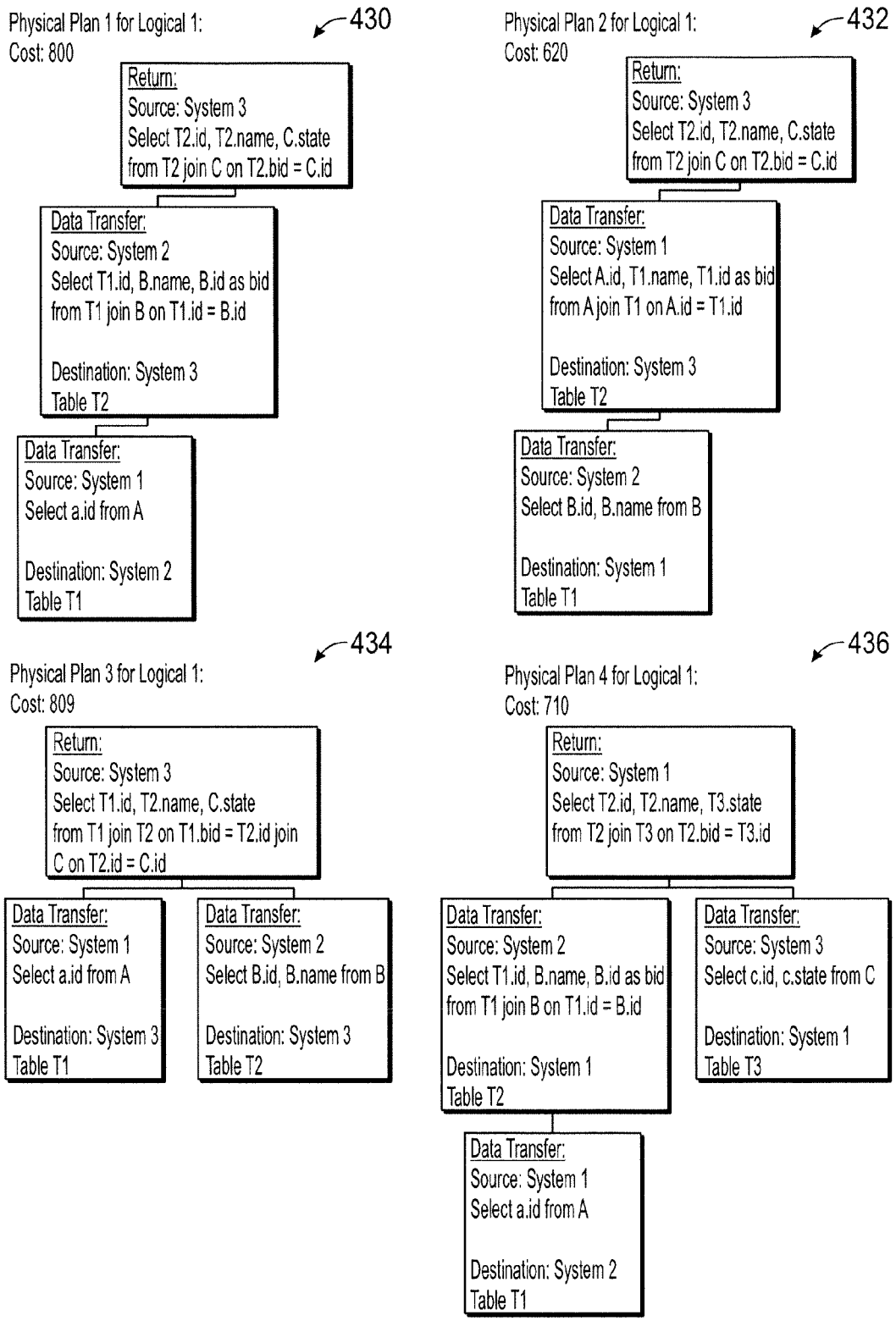
Figures 2, 4B:
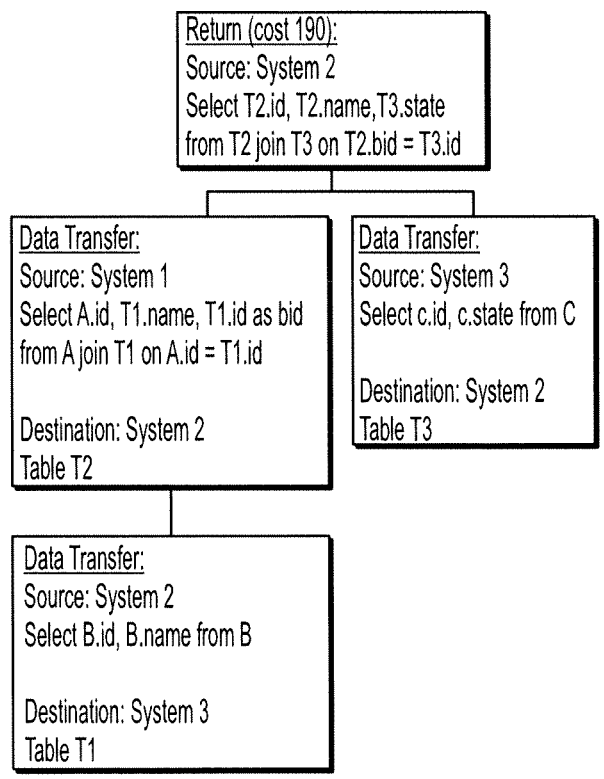
Figures 1, 4C:
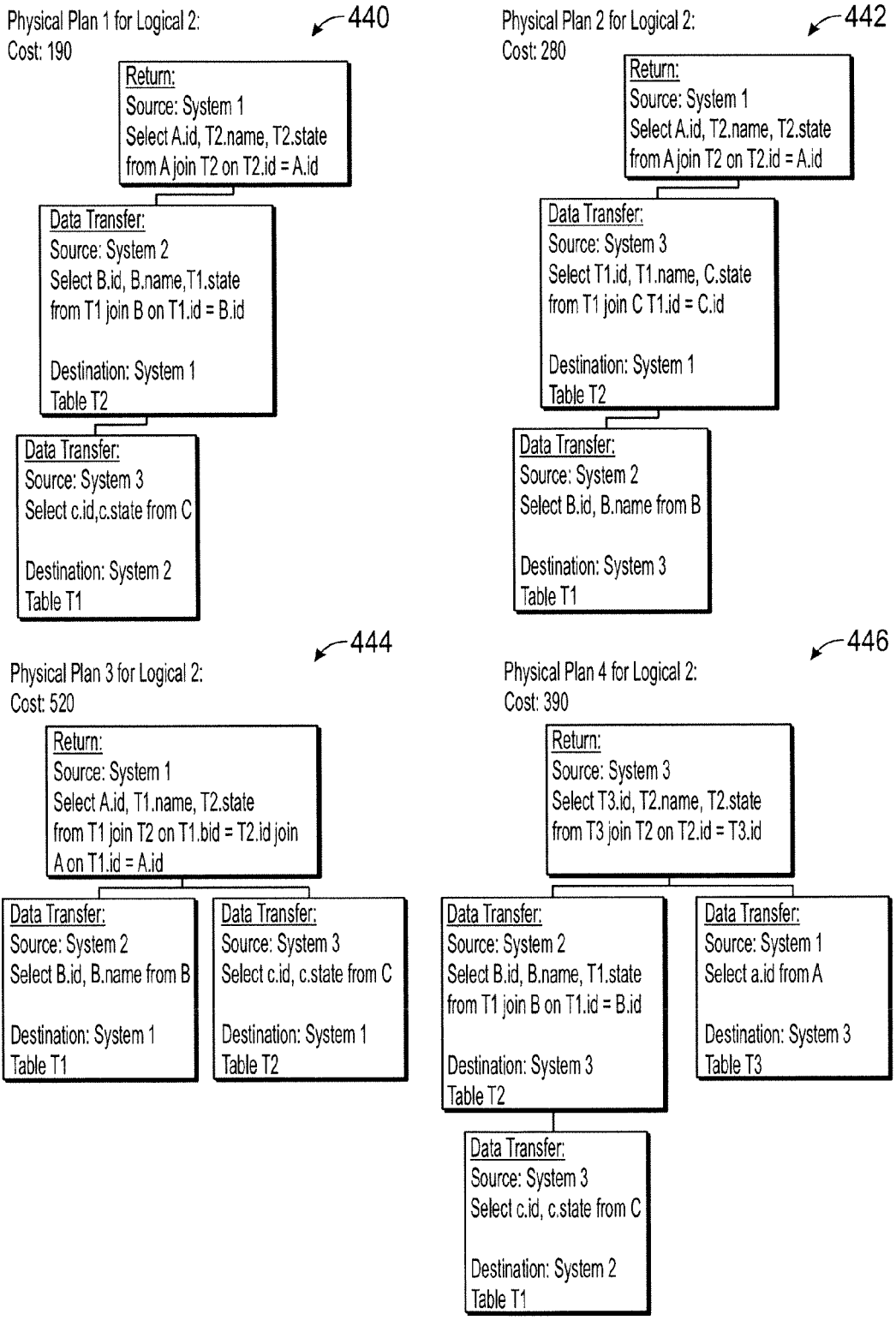
Figures 2, 4C:
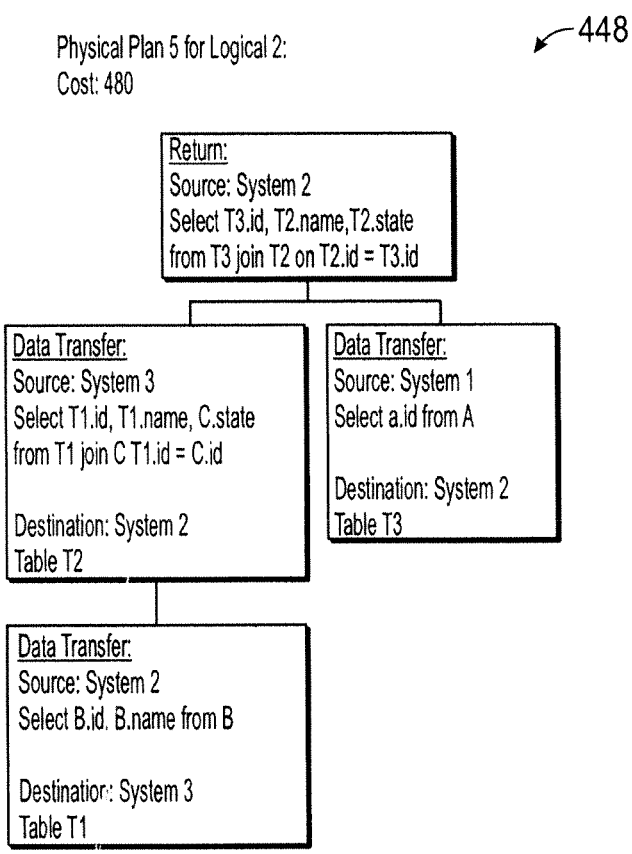

FIGS. 4B-1 and 4B-2 conceptually illustrate an example set of alternative physical plans for a first query tree. FIGS. 4C-1 and 4C-2 conceptually illustrate an example set of alternative physical plans for a second query tree. More specifically, FIGS. 4B-1-4B-2 and FIGS. 4C-1-4C-2 illustrate a set of alternative physical plans, respectively, for the query trees 410 and 420 in FIG. 4A. For the logical plans that are generated in FIG. 4A, the federated query engine may select one of the set of alternative physical plans in either FIGS. 4B-1, 4B-2, 4C-1 and 4C-2 based on a calculated cost for performing a set of operations in the alternative physical plan. In one example, the federated query engine may then execute one or more operations in the selected alternative physical plan and then perform re-optimization of the logical plans and alternative physical plans based on the results of the executed operation(s).

A set of alternative physical plans 430, 432, 434, 436, and 438 for the query tree 410 (that logically represents the query 405 in FIG. 4A) is shown in FIGS. 4B-1 and 4B-2. Each alternative physical plan includes a set of nodes representing operations to be performed on each of the aforementioned data systems 1, 2 or 3. The federated query engine may execute a particular alternative physical plan starting from a bottom node and continuing up until reaching a root node of the alternative physical plan. For example, to execute the alternative physical plan 430, the federated query engine executes, starting at the bottom node, a data transfer operation for transferring results of an operation ("Select a.id from A") at data system 1 over to a table T1 at data system 2. The federated query engine then performs operations in the middle node of the alternative physical plan 430 including a data transfer operation for transferring results of an operation ("select T1.id, B.name, B.id as bid from T1 join B on T1.id=B.id") at data system 2 over to table T2 at data system 3. The federated query engine may continue to the top node of the alternative physical plan 430 to execute an operation ("select T2.id, T2.name, C.state FROM T2.join C on T2.bid=C.id") at data system 3. The federated query engine may return the results of this operation to the user. In a case in which the federated query engine selects one of the other alternative physical plans 432, 434, 436, and 438 for executing the query 405, the selected plan among the alternative physical plans 432, 434, 436, and 438 may be executed by the federated query engine in a similar manner (e.g., starting from the bottom node and continuing up until reaching the top node).

Each of the alternative physical plans 430, 432, 434, 436, and 438 of FIGS. 4B-1 and 4B-2 include an estimated cost for executing the corresponding alternative physical plan. In one example, an estimated cost of a corresponding alternative physical plan may represent a runtime cost for executing a query according to the corresponding alternative physical plan and may be based a number of I/O operations required for executing operations within the query, an estimated amount of time for executing the operations, processing/CPU requirements, expected utilization of network resources, estimated data transfer times, and other factors, etc. In the example of FIGS. 4B-1 and 4B-2, the alternative physical plan 432 has the lowest estimated cost (e.g., 620) among the set of alternative physical plans 430, 432, 434, 436, and 438. In the example of FIGS. 4C-1 and 4C-2, a set of alternative physical plans 440, 442, 444, 446, and 448 are shown. The alternative physical plan 440 has the lowest estimated cost (e.g., 190) among the set of alternative physical plans 440, 442, 444, 446, and 448. Thus, the alternative physical plan 440 has the lowest overall estimated cost among all of the alternative physical plans shown in FIGS. 4B-1, 4B-2, 4C-1 and 4C-2. In one example, the federated query engine selects the alternative physical plan 440 as the alternative physical plan with the lowest overall cost and executes one or more operations from the alternative physical plan 440 by starting from the bottom node and continuing up to the top node similar to the example described above. The federated query engine may return the results of the query after performing the operations in the top node of the alternative physical plan 440.

In some configurations, the federated query engine may not execute all of the operations for the nodes for a given alternative physical plan such as the selected physical plan 440. For instance, a marker for re-optimization may be included at the middle node of the alternative physical plan 440. The federated query engine may execute the operations for the bottom node, persist the results of the bottom node, and then perform re-optimization of logical and physical plans for a remaining set of operations for the query 405 in order to provide a new set of logical and physical plans for the remaining set of operations of the query 405. A subsequent re-optimization of logical and physical plans for other remaining operations of the query 405 may be performed in a similar manner.

Figure 5:
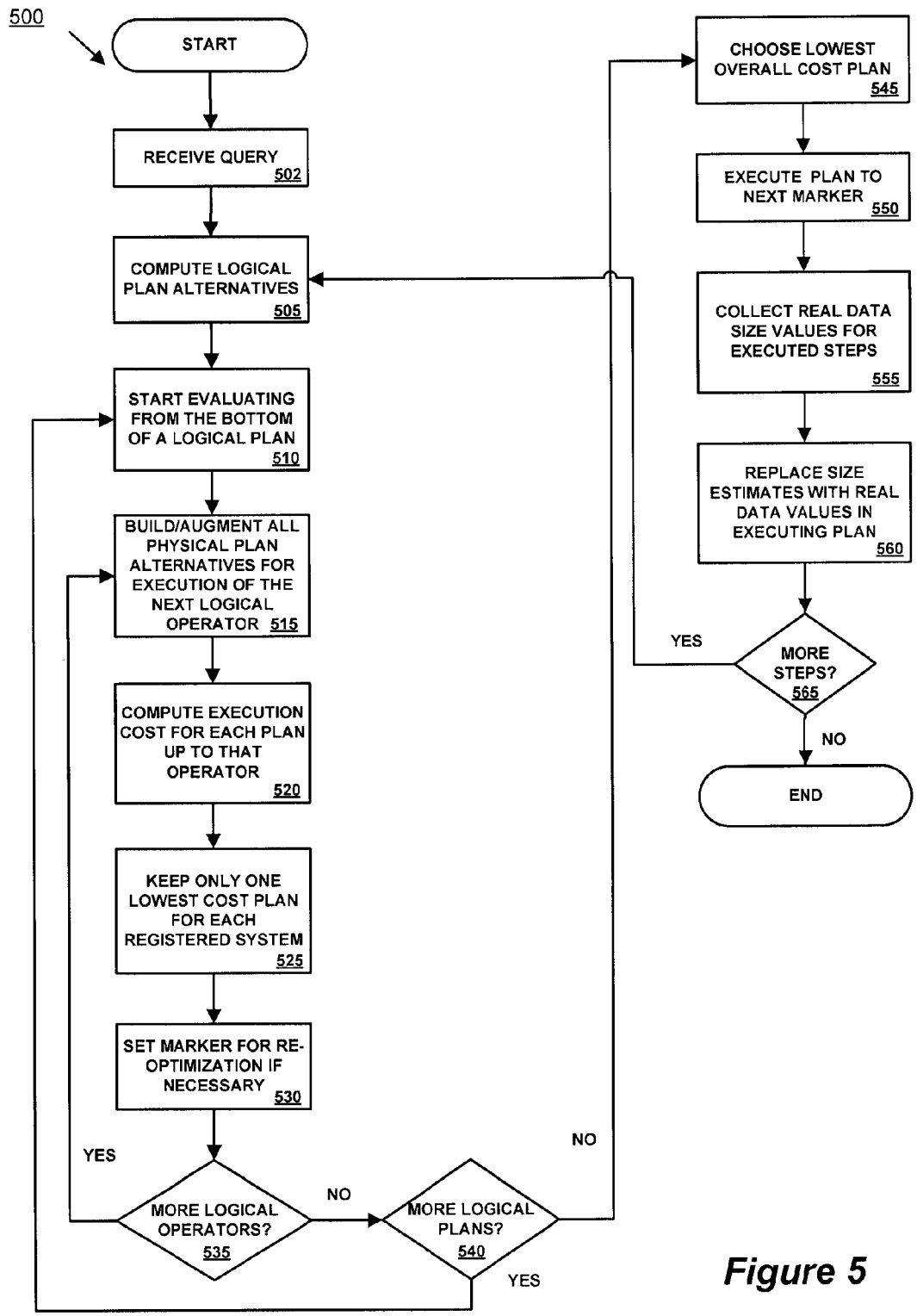
FIG. 5 conceptually illustrates an example process for optimization, re-optimization and execution according to some configurations of the subject technology.

FIG. 5 conceptually illustrates a process 500 representing the logic inside the aforementioned optimizer module 230 described in FIG. 2 above. In some configurations, the process 500 may be implemented by one or more computing devices or systems. Although the example process 500 illustrated in FIG. 5 shows a linear execution of operations, it should be appreciated that any of the operations in FIG. 5 may be executed in a parallel manner and still be within the scope of the subject technology.

The process 500 begins at 502 by receiving a query for data stored across multiple data systems. At 505, the process 500 generates one or more logical representations of a query tree for the query. In some configurations, the logical representations constitute logical plans for executing the query. The process 500 identifies the logical plans corresponding to the logical representations of the query tree that have the best chance for physical execution at highest performance according to the capabilities of respective data systems that may execute a portion of the query. The logical plans that do not represent expected reasonable performance are not added into the list of plans that are retained.

Next, the process 500 starts working on the physical execution plan. The following steps are performed for each logical plan that was generated at 505. To create a physical execution plan, the process 500 at 510 starts evaluating at the bottom of the logical plan, which is the source data (e.g., a table) in one example.

At 515, the process 500 builds physical plan alternatives for each logical plan from the bottom of the logical plan where source data is read, up to the return of results to the end user. The process 500 builds plan alternatives for executing the first logical operation on each of the available data systems. In one example, available data systems may include data systems that do not have persistent or source data, which would then include the need to move data from the source data system to the data system where the operator will be executed under the plan.

Next, the process 500 at 520 computes an execution cost that represents the cost of moving data if necessary and executing the first operation from the query. The costs are based on normalized cost metadata, which represents the ability of the each registered data system to perform that operation on the prescribed amount of data, plus the cost of moving the prescribed amount of data to that data system. This step is repeated for each of the alternative plans.

At this point the number of alternative plans could be up to the cube of the number of registered systems. Each plan has an overall cost associated with all execution up to the point of the currently evaluated logical operator. The process 500 at 525 then prunes out all but the single lowest cost plan per registered system. The total number of alternative plans for execution up to the currently evaluated operator is now reduced to no more than the number of registered systems.

The process 500 at 530 places a marker, if necessary, at a point in the physical execution plan where re-optimization should take place. Different techniques may be utilized to determine if a marker is needed, and also at which point to place such a marker. In some instances, the process 500 may determine that no marker is needed at all.

At 535, the process 500 determines if more logical operators corresponding to remaining operations in the query exist. If so, this series of steps 515-530 is repeated for all logical operators up the query tree. For each logical operator the process 500 builds all available plans using the remaining alternative plans from previously evaluated operators, costs all the alternative plans, and chooses only the best physical plan per registered system based on lowest cost. At 540, the process 500 determines if other logical plans exist (e.g., from 505) and the process 500 then repeats the steps at 510-535 until all logical plans are processed. Once the process 500 reaches the top of each of the logical plans, the process 500 has computed the total cost for executing the plan with the top operator on each of the registered systems.

At 545, the process 500 then chooses the lowest overall execution cost among the logical plan alternatives. In one example, the process 500 executes the plan tree from the bottom up. While executing the plan, the process 500 watches for the aforementioned re-optimization markers placed in the plan by the process 500 at 530. At the point that the process 500 reaches a re-optimization marker, the execution stops at 550. Alternatively, if no re-optimization markers are found, the process 500 continues until completion of the plan. For each step executed completely, the process 500 retrieves actual real data size value (e.g., row counts and sizes, etc.) for the resulting intermediate data results at 535, which may be supplied through some manner from the data system upon completion. At 560, the process 500 replaces size estimates with real data size values in the plan.

At 565, the process 500 determines if more operations are required to execute in the query, and if so a dynamic re-optimization begins. In this instance, the process 500 sends back the data containing actual values from the executed portion of the query and continues to 505. At 505, the process 500 generates one or more logical representations of the remaining operations from the query. The process 500 then repeats steps for reevaluating the logical plans and physical plans for the remaining steps, but utilizes the actual data size values for the executed portion of the query in place of the original estimates. At this point, the remainder of the execution tree may change from the original or it might remain the same. Any changes would potentially affect the remainder of the tree that has not executed yet.

The process 500 again submits a chosen execution plan at 545, and the process 500 executes the portion of the execution plan up to the next marker at 550. The process 500 continues to 555-565 until the entire query execution tree has been successfully executed. The process 500 then ends.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, a combination of separate programs, that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in a form of programming language, including compiled or interpreted languages, declarative or procedural languages, and it can be deployed in some form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

The following description describes an example system in which aspects of the subject technology can be implemented.

Figure 6:
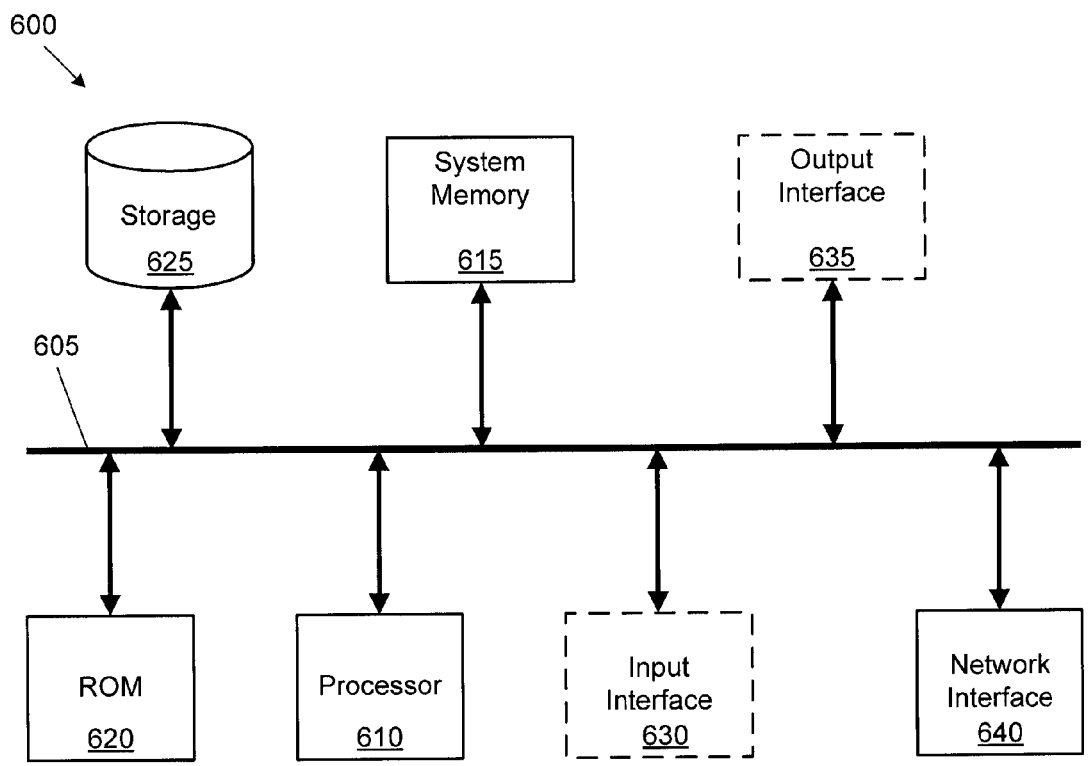
FIG. 6 conceptually illustrates a system with which some implementations of the subject technology may be implemented.

FIG. 6 conceptually illustrates a system 600 with which some implementations of the subject technology can be implemented. The system 600 can be a computer, phone, PDA, or another sort of electronic device. Such a system includes various types of computer readable media and interfaces for various other types of computer readable media. The system 600 includes a bus 605, processing unit(s) 610, a system memory 615, a read-only memory 620, a storage device 625, an optional input interface 630, an optional output interface 635, and a network interface 640.

The bus 605 collectively represents all system, peripheral, and chipset buses that communicatively connect the numerous internal devices of the system 600. For instance, the bus 605 communicatively connects the processing unit(s) 610 with the read-only memory 620, the system memory 615, and the storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the system 600. The storage device 625, on the other hand, is a read-and-write memory device. This device is a non-volatile memory unit that stores instructions and data even when the system 600 is off. Some implementations of the subject technology use a mass-storage device (such as a magnetic or optical disk and its corresponding disk drive) as the storage device 625.

Other implementations use a removable storage device (such as a flash drive, a floppy disk, and its corresponding disk drive) as the storage device 625. Like the storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the subject technology's processes are stored in the system memory 615, the storage device 625, and/or the read-only memory 620. For example, the various memory units include instructions for processing multimedia items in accordance with some implementations. From these various memory units, the processing unit(s) 610 retrieves instructions to execute and data to process in order to execute the processes of some implementations.

The bus 605 also connects to the optional input and output interfaces 630 and 635. The optional input interface 630 enables the user to communicate information and select commands to the system. The optional input interface 630 can interface with alphanumeric keyboards and pointing devices (also called "cursor control devices"). The optional output interface 635 can provide display images generated by the system 600. The optional output interface 635 can interface with printers and display devices, such as cathode ray tubes (CRT) or liquid crystal displays (LCD). Some implementations can interface with devices such as a touchscreen that functions as both input and output devices.

Finally, as shown in FIG. 6, bus 605 also couples system 600 to a network interface 640 through a network adapter (not shown). In this manner, the computer can be a part of a network of computers (such as a local area network ("LAN"), a wide area network ("WAN"), or an Intranet, or an interconnected network of networks, such as the Internet. The components of system 600 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and the claims of this application, the terms "computer", "server", "processor", and "memory" all refer to electronic or other technological devices. These terms exclude people or groups of people. For the purposes of the specification, the terms display or displaying means displaying on an electronic device. As used in this specification and the claims of this application, the terms "computer readable medium" and "computer readable media" are entirely restricted to tangible, physical objects that store information in a form that is readable by a computer. These terms exclude wireless signals, wired download signals, and other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be a form of sensory feedback, e.g., visual feedback, auditory feedback, or tactile feedback; and input from the user can be received in a form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or a combination of one or more such back end, middleware, or front end components. The components of the system can be interconnected by a form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that a specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable a person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

What is claimed is:

1. A machine-implemented method, the method comprising:
   receiving a query for data stored across a plurality of data systems;
   generating a plurality of first logical plans for executing the query;
   for each of the plurality of first logical plans:
      generating a first set of physical plans for executing the query on the plurality of data systems based on the respective first logical plan;
      determining an execution cost for each physical plan from the first set of physical plans; and
      selecting the physical plan with a lowest determined execution cost from the first set of physical plans;
   selecting a physical plan with a lowest execution cost from among the respective physical plans selected for each of the plurality of first logical plans;
   executing an operation from the query according to the physical plan selected from among the respective physical plans selected for each of the plurality of first logical plans;
   updating the query based on results from the executed operation;
   generating a plurality of second logical plans for executing the updated query and a respective second set of physical plans for each of the plurality of second logical plans;
   determining an execution cost for each physical plan from the respective second sets of physical plans for the plurality of second logical plans;
   selecting a physical plan with a lowest determined execution cost among the respective second sets of physical plans for the plurality of second logical plans;
   executing an operation from the updated query according to the physical plan selected from among the respective second sets of physical plans;
   updating the updated query based on results from the executed operation from the updated query; and
   repeating the steps for generating a plurality of second logical plans and respective second sets of physical plans, determining an execution cost for each physical plan from the second sets of physical plans, selecting a physical plan with a lowest determined execution cost among the second sets of physical plans, executing an operation from the updated query, and updating the updated query until the updated query is complete.

2. The method of claim 1, wherein updating the query based on results from the executed operation from the query further comprises:
   persisting data based on results from the executed operation.

3. The method of claim 2, wherein the persisted data is utilized to replace size estimates with real data values in the respective physical plans for each of the plurality of second logical plans.

4. The method of claim 1, wherein each logical plan comprises a sequence of one or more operations for executing the query.

5. The method of claim 4, wherein each logical plan comprises a query tree including one or more nodes, each node representing a respective operation in the sequence of one or more operations for executing the query.

6. The method of claim 5, wherein the first operation corresponds with a bottom node from the query tree.

7. The method of claim 1, wherein selecting a physical plan with a lowest execution cost among the selected respective physical plans of each of the logical plans comprises:
   selecting the physical plan with a lowest execution cost for the first operation among the selected respective physical plans.

8. The method of claim 1, further comprising:
   persisting data resulting from the executed operation from the updated query;
   generating a set of optimized physical plans for executing a remaining set of operations from the updated query based on the persisted data;
   selecting a physical plan with a lowest execution cost among the optimized physical plans; and
   executing an operation from the updated query according to the selected physical plan.

9. The method of claim 1, wherein determining the execution cost for each physical plan from the first set of physical plans is based on a historical record of previously executed operations.

10. The method of claim 1, wherein the execution cost includes at least one of a latency cost, a cost per row, and a cost corresponding to a respective operation.

11. The method of claim 1, wherein the data stored across a plurality of data systems comprises federated data.

12. The method of claim 1, wherein determining the execution cost for each physical plan from the first set of physical plans is based on a set of business rules.

13. The method of claim 1, further comprising:
   providing results of the executed operation from the updated query for output.

14. A system, the system comprising:
   memory;
   one or more processors;
   one or more modules stored in memory and configured for execution by the one or more processors, the modules comprising:
      a protocol module configured to receive a query;
      a parser module configured to receive the query from the protocol module, validate a syntax of the received query, convert the query into a query tree if the syntax is validated, and identify each data element referenced in the query tree;

a binder module configured to add metadata for each data element referenced by the query tree;

an optimizer module configured to determine one or more physical execution plans based on the query tree, estimate a cost for each of the physical execution plans based on the metadata for each data element referenced by the query tree, and select a respective physical execution plan with an overall lowest estimated cost; and an execution engine module configured to execute an operation from the query based on the selected respective physical execution plan, and persist data resulting from the executed operation from the query, wherein the optimizer module is further configured to re-determine one or more physical execution plans based on the query tree updated with the data resulting from the executed operation, estimate a cost for each of the re-determined one or more physical execution plans based on metadata for each data element referenced by the updated query tree, and select a physical execution plan with an overall lowest estimated cost from the re-determined one or more physical execution plans, wherein the execution engine module is further configured to execute an operation from the updated query tree based on the physical execution plan selected from the re-determined one or more physical execution plans, and persist data resulting from the executed operation from the updated query tree, and wherein the optimizer module is further configured to repeat the re-determining and cost estimating steps, and the execution engine is further configured to repeat the executing an operation from the updated query tree step and the persisting data from the operation step until execution of the updated query tree is complete.

15. The system of claim 14, wherein the binder module adds metadata for each data element referenced by the query tree by utilizing a metadata manager module.

16. The system of claim 14, wherein the metadata manager module is further configured to retrieve metadata about results of the operation, and send the retrieved metadata information to the optimizer module for re-optimization of the physical execution plans.

17. The system of claim 14, wherein the metadata manager module is configured to:
bind to each data element associated metadata, wherein the associated metadata includes a number of rows, row size, or data types.

18. The system of claim 14, wherein the associated metadata is stored in persistent data store corresponding to a data system for each data element.

19. The system of claim 14, wherein the optimizer module is further configured to estimate the cost for each of the physical execution plans by querying a cost estimation module.

20. The system of claim 14, further comprising:
a cost estimation module configured to query a data system to determine an estimated cost for the operation.

21. The system of claim 20, wherein the estimated cost is based on latency for the data system, cost per row, or a cost per operation in the query.

22. The system of claim 20, wherein the cost estimation module is further configured to:
normalize the estimated cost across one or more data systems.

23. A non-transitory machine-readable medium comprising instructions stored therein, which when executed by a machine, cause the machine to perform operations comprising:

receiving a query for data stored across a plurality of data systems;

generating a plurality of first logical plans for executing the query and a respective first set of physical plans for executing each of the plurality of first logical plans on the plurality of data systems;

determining an execution cost for each physical plan of the first sets of physical plans;

selecting a physical plan with a lowest determined execution cost from among the first sets of physical plans;

executing an operation from the query according to the physical plan selected from among the first sets of physical plans;

updating the query based on results from the executed operation;

generating a plurality of second logical plans for executing the updated query and a respective second set of physical plans for executing each of the plurality of second logical plans on the plurality of data systems;

determining an execution cost for each physical plan of the second sets of physical plans;

selecting a physical plan with a lowest determined execution cost from among the second sets of physical plans;

executing an operation from the updated query according to the physical plan selected from among the second sets of physical plans;

updating the updated query based on results from the executed operation from the updated query; and repeating the operations for generating a plurality of second logical plans and respective second sets of physical plans, determining an execution cost for each physical plan from the second sets of physical plans, selecting a physical plan with a lowest determined execution cost among the second sets of physical plans, executing an operation from the updated query, and updating the updated query until the updated query is complete.

24. The non-transitory machine-readable medium of claim 23, comprising further instructions stored therein, which when executed by the machine, cause the machine to perform further operations comprising:
providing results of the completed query for output.

25. The non-transitory machine-readable medium of claim 23, comprising further instructions stored therein, which when executed by the machine, cause the machine to perform further operations comprising:
persisting the results from the executed operation.

* * * * *